United States Patent [19]

Colton et al.

[11] 4,190,428

[45] Feb. 26, 1980

[54] PLANT TREATING COMPOSITION

[75] Inventors: Martin S. Colton, Avon; Esra Pitchon, Flushing; Robert J. Ravallo, Mahopac, all of N.Y.

[73] Assignee: General Foods Corporation, White Plains, N.Y.

[21] Appl. No.: 793,802

[22] Filed: May 4, 1977

[51] Int. Cl.$^2$ .................... C05B 15/00; C05C 9/00
[52] U.S. Cl. .................................. 71/29; 71/30; 71/28; 71/64 C
[58] Field of Search ............... 71/11, 28, 13, 29, 30, 71/64 C, 64 E

[56] References Cited

U.S. PATENT DOCUMENTS

| | | | |
|---|---|---|---|
| 3,660,070 | 5/1972 | Maruta | 71/64 E |
| 3,713,404 | 1/1973 | Lavo | 71/64 C |
| 3,918,952 | 11/1975 | Neumiller | 71/29 |
| 4,001,378 | 1/1977 | Jasnosz | 71/28 |

FOREIGN PATENT DOCUMENTS

| | | | |
|---|---|---|---|
| 671553 | 10/1963 | Canada | 71/11 |
| 2448740 | 4/1976 | Fed. Rep. of Germany | 71/11 |

OTHER PUBLICATIONS

*McCutcheon's Detergents and Emulsifiers,* 1975, MC Publishing Co., N.J., p. 69.

*Primary Examiner*—Morris O. Wolk
*Assistant Examiner*—Chris P. Konkol
*Attorney, Agent, or Firm*—Mitchell E. Alter; Daniel J. Donovan; Bruno P. Struzzi

[57] ABSTRACT

Dry foamable concentrates comprising a plant agent, a foaming agent, and an alcohol of limited solubility e.g., butanol, capable of spumescent constitution with water to provide a stable foam composition acting as a tracer in application.

6 Claims, No Drawings

PLANT TREATING COMPOSITION

BACKGROUND OF THE INVENTION

The increased popularity of home gardening, and the expense of commercial servicing has activated interest in homeowner application of plant agents. U.S. Pat. Nos. 3,713,404, 3,871,130 and 3,922,977 of Lavo et al. to the common assignee describe systems and methodology adapted to this interest, the texts of which are incorporated herein by reference. Disclosed is a method for the application of plant agents utilizing a garden hose coupled to a residential water supply providing a stream of water at a static pressure of about 15 to about 70 psig. wherein the stream of water is intorudced to a foam generation zone, a foam concentrate comprising a foaming agent and a plant agent is educted into the stream by a venturi arrangement, the mixture is mechanically agitated and the proportion of water and foam concentrate controlled to maintain a dilution of 15 to 90 parts by volume of water to each part of concentrate, and the thus formed foam providing solution is then directed against a foraminous barrier through which a current of air is simultaneously and unidirectionally forced, whereupon the solution is spumed for application into a deformable foam.

The foam concentrates heretofore employed in generating the aforesaid foams are conveniently provided in ready-to-use form as liquid concentrates containing the plant-treating agent often a fertilizer together with the foaming and stabilizing agents. Such concentrates have also included a water-soluble lower alkanol, typically, isopropanol, primarily to overcome the foam-inhibition by the organic fertilizer and high-salt content of the plant-treating composition, thus reducing the requirements of foam stabilizer and permitting tolerable viscosities of the liquid foam concentrate by controlling the fluidity. Such liquid fertilizer compositions are disclosed in U.S. Pat. No. 3,918,952.

These compositions, however, suffer from a lack of stability upon long term storage with solid ingredients, usually organic nitrogen sources, such as urea-formaldehyde, separating in cake form which is difficult to redistribute through the liquid medium. Further, the ability of such concentrates to form spumescent foams diminishes with long term storage, in part due to an increase in viscosity of the concentrate.

Thus, there is a need for dry, shelf-stable concentrates in ready-to-use form for the purpose of foam application particularly for use with foam generators employed in homeowner applications.

The present invention provides foam concentrates of excellent storage stability and other improved properties embodied in the following description.

GENERAL DESCRIPTION OF THE INVENTION

In accordance with the present invention, dry foam concentrates are provided which, under the conditions of forming a foam with a portable foam producer, yield light and fluffy foams even at low foam agent concentration.

In a preferred form of the invention, there are provided foamable concentrates inclusive of particulate-containing systems, all capable of formulation in liquid systems notwithstanding extended storage. The base concentrates are devoid of significant liquid content i.e., are substantially 'dry' or anhydrous but liquifiable in aqueous systems for dilution and foaming in use.

An especially valuable characteristic of the present concentrated formulations is successful reconstitution to intermediate and high expansion foams, even after long term storage, notwithstanding significant particulate content and/or relativey high salt levels.

The present new foam concentrates are comprised of an alcohol of limited water solubility, and include at least one plant treated agent and a foaming agent. Surprisingly, it has been discovered that alcohols of limited water solubility impart these desirable properties to foam concentrates. Thus, foams of acceptable character may be reproducibly reconstituted even after long term storage, since the level of foam agent required may be substantially reduced. Such dry concentrates in particulate form have realized shelf life in excess of one year under cyclic ambient conditions.

In a preferred embodiment the concentrates comprise up to 20 to 25 percent by weight of insoluble or difficultly soluble material often of high salt content e.g., fertilizer which exhibits a tendency to clump or cake and resists dispersion.

Aqueous liquid concentrates containing organic fertilizer, although of satisfactory short term stability e.g., four months, do not approach corresponding dry concentrates in storage stability, primarily due to the caking of the sediment which forms after varying periods of storage. After 4 months of storage, the sediment usually does re-disperse and the concentrate does provide acceptable results as to the viscosity and ease of foaming but longer storage periods result in the sediment being almost impossible to re-disperse.

The level of the limited solubility alcohols required to reconstitute intermediate and high expansion foams are substantially less than water-soluble alcohols, typically from $\frac{1}{4}$ to $\frac{1}{2}$ as much water-insoluble alcohol, to accomplish the same foam stabilizing and enhancing effect as the watersoluble alcohols. The present compositions may also provide more efficient foams for the purpose of the homeowner, where it is desired to produce a higher expansion ratio foam from liquid concentrate at normal foam agent levels. Conveniently, the alcohols of choice are also characterized by reduced volatility, adding to the shelf life potential.

The present new compositions are also particularly well-suited for production of foams which are characterized by a disrupted or discontinuous form as projected or applied. The production of such foams and the apparatus therefor are more fully described in commonly assigned application Ser. Nos. 793,693 and 793,694 of Ravallo and Pitchon, Colton, Kemprowski and Schulman, respectively filed concurrently herewith and incorporated herein by reference.

The alcohols of limited water solubility contemplated by the present invention are those which are soluble to the extent of about 15–20 parts per 100 parts of water or less. Typically, the higher alkanols containing at least 4 carbon atoms are exemplary of such alcohols e.g., of the butanols, isobutyl, n-butyl and sec-butyl alcohols, and the isometric amyl, hexyl and octyl alcohols; as well, the cycloalkanols, such as cyclohexanol and cycloheptanol, and aralkanols such as benzyl alcohol and phenylethanol are suitable. Generally, the contemplated alcohols preferably should have up to about 10 carbon atoms although alcohols of higher carbon content are operable but with less ease because they tend to be of lower fluidity and are less available commercially. $C_4$–$C_5$ alcohols are preferred.

The most preferred of the contemplated alcohols are the aforementioned isomeric butanols, n-butyl, isobutyl and sec-butyl alcohols. These are preferred because they are readily available and in present experience give the best results. On direct comparison with water-soluble lower alkanols such as the commonly employed isopropanol, the said butyl alcohols showed remarkably superior results in foamable compositions prepared therefrom. Only about ¼ and ½ as much butyl alcohol was required to accomplish the fluidity and foam enhancement of isopropanol, which provides an economical advantage to the present compositions. Further, the butyl alcohol foam concentrates provided a better foam in that at the same concentration of foam agent, the foam was fluffier and lighter than the isopropanol-containing foam concentrates. Foam concentrates prepared with butyl alcohols also show improved storage stability. In general, the butyl alcohol compositions on foaming gave higher expansion ratios at lower concentration than the isopropanol compositions.

The foam-providing concentrates of the invention are comprised of at least one constituent, a foaming agent, that is spumable in aqueous dispersion and adapted in such form to provide the continuous phase which constitutes the walls of the cells or bubbles in the foam material derived thereon. In addition to being adaptable to being spumed into a three-dimentional foam structure, the foaming agent in aqueous dispersion is chemically unreactive with the plant chemical and/or biological agent, or other agents, which are dissolved or blended in the foam-providing concentrates.

Solid, particulate foaming agents are preferred as contrasted with liquid materials, to reduce the liquid content of the dry concentrates. Exemplary dry surfactants are alkyl aryl sulfonates, higher alcohol surfacetate salts, such as sodium lauryl surfacetate, and condensates of alkylene oxides e.g., ethylene oxide, with hydrophilic bases made from propylene oxide and propylene glycol.

The normally solid sulfonate foaming agents and particularly compositions principally comprising the higher alkyl e.g., $C_8$–$C_{18}$ species of alkyl or alkylaryl sulfonates are preferred. Outstanding results have been achieved with alpha olefin sulfonates, wherein the olefin is essentially $C_{14}$–$C_{16}$, such as Bio Terge AS-90F.

Since the intended use of the spumed foam product is that of a vehicle for applying agents to plants and associated soils, the pH of the applied foam is established at a level which is compatible to plant life, and preferably that level which furthers healthy growth of the plant on which it is deposited. This criterion, in general requires the foam to have a pH value of above 6.0 and preferably to be in the range of 6.5 to 9.0. Those versed in the art of horticulture, however, will readily recognize that foams having a slightly lower pH value can be used on "acid loving" plants such as azaleas and foams having a high pH level are compatible with other types of plant life.

The foam-providing concentrate of the invention is desirably spumable in an aqueous dispersion to a foam having a controllable degree of expansion when mechanically generated with a flow of tap water from a supply source with a relatively low pressure of 15 lbs. per sq. in. as well as with much higher pressures—typically up to 70 lbs. per sq. in. With respect to obtaining and controlling the degree of expansion of the generated foam under the limiting conditions of homeowner use it has been found convenient to employ certain "foam booster" chemical agents such as blended alkyl sulfates, alkyl sulfonates, alkylol ether sulfates, lauric acid monoethanolamide, stearic acid monoethanolamide, aluric acid isopropanolamide and mixtures of lauric acid and myristic acid monoethanolamide. Any such booster will of course be selected from solid materials to prepare the dry concentrate.

In addition to the above, the spumable foam exhibits a degree of stability which precludes the foam from rapidly "breaking," but assures a suitable degree of cohesiveness, i.e., providing a visible three-dimensional foam structure on the ground for a period ranging upwards from 5–30 minutes after application. The stability of the foam products of the invention can be controlled where required by the addition of a small amount of certain compounds which are generally classed as humectants. Particularly, polyhydric alcohols such as glycerol, propylene glycol, and ethylene glycol, lauryl alcohol, myristyl alcohol, stearyl alcohol or mixtures thereof have been found to be effective.

One of the important advantages of the invention is ease of manipulation during application of the plant agent-foam combination. In this respect the foam-providing mixture is highly concentrated in order to minimize weight and bulk and thereby be readily portable by the user. In view of its concentrated form and the fact it is intended to be educted into a stream of water for purposes of dilution and mechanical agitation, it is important that the fluidity of the concentrate be maintained during application. The alcohols of limited solubility adequately control the fludity of the concentrate at the anticipated usage temperature range of 50°–120° F. and, most importantly, when formulated according to the procedures described in the illustrative examples herein, do not adversely effect the stability of the foam product when it is applied to the lawn or other plant life.

Understandably, the invention encompasses combinations of different additives and differently selected ratios or quantities of additives for the purpose of tailoring foam-providing concentrates to yield foam products having specific desired characteristics for use on particular types of plants, plant foliages and soils.

Those agents which can be applied by the methods of the invention, in addition to seeds, include but are not limited to, organic and inorganic fertilizers, herbicides, fungicides, insecticides, pesticides, sterilants, minerals, hormones and like materials commonly used in agriculture for the maintenance or nurture of plant life, or the control or eradication of pests or disease therein, or the presence of undesired species thereabout.

In almost all instances, with the exception of plant seeds, the plant agent is either soluble in the aqueous concentrate or forms a relatively stable colloidal suspension. In those instances wherein the plant agent is oil soluble, micellar solubilization of the oil soluble plant agent is achieved provided the oil is present in amounts less than about 10 percent by volume of the concentrate. In those instances where the oil content is greater than about 10 percent, an augmenting emulsifier is employed, when necessary, to provide a stable foam-providing emulsion concentrate of the plant agent. Representative auxiliary emulsifiers for this purpose are sodium stearate, sodium laurate, and lauryl benzene sulfonate.

In the preparation of the present concentrates it is advantageous to incorporate dispersants to prevent caking. Solid dispersants for this purpose are well-known and include for example, silicon dioxide, pyrogenic silicon dioxide, pyrogenic aluminum oxide, sodium silicoaluminate, and others. Usually such dispersants are employed at low levels, e.g., about 0.5 to about 1.5% by weight of the concentrate. Cab-O-Sil M-5 is preferred.

The amount of the alcohol of limited solubility used in the present concentrates can be varied appreciably to attain whatever results are desired. As hereinbefore indicated, the said alcohols influence the production of lighter, fluffier foams and the amount of alcohol employed is correlated to the type of foam produced. Generally, these alcohols can be used at levels ranging from about 1% to about 10% of the concentrate weight. Commonly, the level employed is from about 2% to about 5%, preferably about 2.5% to about 4%, so that the concentrate assumes a consistency between fluor and sand:like buckwheat pancake mix in appearance.

Typically, fertilizer concentrates will comprise as much as 75 to 85 percent by weight of nitrogeneous material, often urea based and commonly containing a proportion, 25 to 50 percent in some cases, of insoluble or difficultly soluble material. Controlled release fertilizers typified by low solubility or high particulate content include the urea-aldehyde condensation products, such as urea-formaldehyde, urea-isobutyraldehyde, urea-acetaldehyde, urea-furfural, urea-glyoxal, and urea-crotonaldehyde; ammoniated coal; urea-pyrolyzate; ammonium polyphosphates; salts such as metal ammonium phosphates and polyphosphate e.g., an alkali metal tripolyphosphate.

An amount of surfactant/alcohol in the range of 5 to 10 percent by weight of the composition has proven suitable, in a weight proportion conveniently approximating 1:1.2 to 1.2:1. Fertilizer compositions prepared in accordance with the most preferred aspects of the invention may comprise 0.25 to 2.0 parts of Bio Terge AS-90F, and 0.35 to 1.5 parts isobutyl alcohol in combination with about 2 to 30 parts of controlled release fertilizer components. Most preferably, the fertilizer concentrate comprises 1.2 to 14.3 parts of Uramite (M), 0.85 to 10.2 parts of urea (agriculture grade, uncoated prills) and 2 to 2.6 parts of potassium tripolyphosphate as the controlled release composition. Commonly, 0.09 to 0.9 parts of silicon dioxide (Cab-O-Sil) is added as a dispersing aid.

The dry, particulate ingredients used for preparing the present new concentrates are preferably milled or comminuted into fine powder form using standard comminuting apparatus, e.g., a Fitz Mill Model D Comminuting Machine, using for example a 50-mesh screen. The comminuted ingredients are thoroughly blended with the foaming agent and the selected alcohol and the resulting uniform mix is then packaged. When water is included, the concentrate is, of course, a liquid and is stored in suitable containers. When the concentrate is dry, which is the preferred form of the invention, the mixture is packaged in dry, sealed containers.

The dry concentrates are constituted with water to obtain liquid concentrates for use with standard foam-producing apparatus. The procedure merely requires mixing the dry concentrate with water, e.g., usually about 3.5 pounds per liter of water, and thoroughly mixed for about 30 secs during which the ingredients disperse throughout the water. The liquid concentrate is then ready to be used with the foam producing apparatus.

The diluent used to form the concentrate may comprise a liquid corresponding to the projecting stream e.g. water, or where the plant chemical is oil soluble, the formulation comprehends an emulsifiable concentrate. Whether the starting material is dry or premixed in aqueous or emulsifiable form, the concentrate comprising plant agent and foam generating constituents is ultimately disposed for use in a zone adjacent the point of eduction into the liquid stream, conveniently in a liquid receptacle or tank adapted to form or be carried in a back pack.

In the operation of the system the rate of supply of the projecting fluid is established by an orifice of controllable dimension and the degree of dilution is similarly determined by the selection of concentrate control orifice. The premix or concentrate is educted through a venturi arrangement into the liquid stream established through the foam generation zone, at a suitable rate of dilution, and thus formed foam providing solution or dispersion is passed through an extended zone for further interaction between plant agent and diluent involving mixing, solvation, surface wetting or other phenomena. The stream is then formed into a projecting spray of incipient foam-forming character by passage through a spaced foraminous barrier and the foam applied to the surface being treated.

The system can take the form of a back pack unit constituting a liquid receptacle for the concentrate connected by means of an eduction tube disposed in operation below the surface of the liquid to a separate foam generation zone defined within the pack, said zone being adapted to receive at the entry a common garden hose and connecting at the outlet side to an enclosed mixing zone formed of a short length of hosing which receives the diluted concentrate, introduced intermediate of the foam generation zone through the eduction tube by means of a venturi arrangement. The nozzle and foraminous barrier elements are contained in a lightweight arc shaped applicator equipped with a handle and suitable controls and the form is projected therefrom over and about the treated surface in a generally vertical spray i.e. the long dimension of the nozzle orifice and the screen are positioned fixedly relative to the handle such that normal application would dispose them vertically to the ground. The generally F-shaped spray may project 5 to 20 feet, with a relatively even distribution of foam balls formed therein being dispersed freely about the treated surface in a manner controlled by the sweep of the applicator. With some limited experience and information regarding dosage level required, the homeowner can readily direct the spray controllably, and if desired, utilize the foam balls as markers, a few inches or more apart.

The 'foams' of this invention are of restricted durability i.e. are resistant to immediate degradation and of sufficient cohesiveness to permit visual differentiation under normal conditions for periods of at least 5 to 20 minutes, but gradually degrade below the noticeable level over the short term i.e. within 1-2 hours. In other respects, the foams are deformable rather than stiff or resistant to the touch as would characterize a set, hardened or cured foam, and of sufficient surface stickiness to resist removal from the surface to which it is applied by light breezes. Reference to a disrupted foam herein is to be distinguished from the condition referred to as a broken foam, the latter denoting a degradation or breakdown of the ultimate foam structure rather than a stable static condition involving discrete foam formations intended by the former. The foam balls to which reference is made are believed to be made up of a multiplicity of individually foamed particles comprising the usually bubbled configuration cohesively structured into the three dimensional orbs i.e. spheres or domes seen upon projection and application.

These foams may exhibit an expansion ratio of 2:1 up to 200:1 but preferably are of intermediate scale, being of the order of 8:1 up to 80:1. The water powered foam generator will dilute the concentrate with about 15 to 90 preferably 20 to 50 parts by volume of water to one part of concentrate to provide (at 0.0002 to 0.003 parts by weight of foam agent as applied). Coverage for such a system will be about 2500 ft.$^2$ in less than 5 minutes at a water rate of 4.75 gpm.

An acceptable expansion ratio may be determined visually with some experience, but initially may be ascertained by reference to the following test: A foam applicator, positioned about 48 inches from the substrate and elevated about a foot above the eduction point is utilized to project foam onto a measured surface (for convenience, one or more three liter beakers provide suitable means for capturing the foam in a measurable manner.) The measured quantity of foam (in case of beakers, filled to the top) is allowed to lie at rest for 5 to 10 minutes, the water drained or otherwise separated in a measured manner and the expansion ratio calculated as follows:

$$\text{Expansion Ratio} = \frac{\text{foam volume}}{\text{water volume}} = \frac{\text{Total volume-water volume}}{\text{water volume}}$$

Measurements are made with tap water between 50° and 75° F., at flow rates of 4.1 gal/min to 2.75 gal/min.

The term plant is used in its normally broad sense as inclusive of bushes, flowers, shrubs, foliage, trees, grass etc. although it is understood that mechanical application in accordance herewith is of the short throw variety ordinarily connected with ground application.

The following Examples are offered by way of illustration of the various aspects of the present invention, without limitation.

Each formulation is foamed using the preferred foam apparatus of concurrently filed application Ser. No. 793,694 (attached to an ordinary garden hose) having:
a. Vee Jet nozzle to give rectangular, solid spray,
b. 80° angle for spray
c. 6 mesh stainless steel screen with 0.035" wire diameter,
d. 5" distance from nozzle to curved screen with the screen being 2" wide and having a 9" arc, and
e. minimum contact time of about 1.1 seconds for concentrate and water prior to discharge from the nozzle, provided by a four foot hose between the point of eduction and discharge.

The ratio of concentrate to water employed is one part concentrate to 17–49 parts of water, depending on the water flow rate through the mixing zone. Expansion ratios of at least 18/1 are easily achieved, with excellent foaming. At a 4.85 gal/min. flow rate at 50° F., the expansion ratios range from 27/1 to 39/1. Dilutions are suitably established at 3.75 to 5.0 gpm with a water temperature ranging from 40° to 95° F.

EXAMPLE I

Dry Foam-providing Concentrate with Organic-Inorganic Fertilizer

| Formulation | Lbs. | % |
| --- | --- | --- |
| Uramite M | 7.14 | 47.92 |
| Urea (Agric. grade, uncoated prills) | 5.11 | 34.29 |
| KTP* | 1.32 | 8.86 |
| FeSO$_4$ | 0.176 | 1.18 |
| Bio-Terge AS-90F | 0.511 | 3.43 |
| Isobutyl alcohol | 0.481 | 3.23 |
| Cab-O-Sil M-5 | 0.163 | 1.09 |
|  | 14.90 |  |

(*KTP is potassium tripolyphosphate)

The uramite M, urea, potassium tripolyphosphate acid and ferrous sulfate are milled through a Fitz Mill (Mode D) comminuting machine with a 50 mesh screen using hammer blades at blade speed of 4023 rpm and motor speed of 1760 rpm. The Bio-Terge AS-90F and Cab-O-Sil M-5 is combined with the so-milled ingredients and tumbled in a large poly bag until completely blended. The isobutyl alcohol is then added to the poly bag and thoroughly mixed with a tumbling action. The resulting dry, uniform mix is then passed through a 16-mesh screen to remove any residual gross clumping and then packaged.

EXAMPLE II

Dry Foam-providing Concentrate of Fertilizer and Pre-Emergent Crabgrass Killer

| Formulation | Lbs. | % |
| --- | --- | --- |
| Uramite (M) | 7.14 | 43.88 |
| Urea (Agric. grade uncoated prills) | 5.11 | 31.41 |
| KTP | 1.32 | 8.11 |
| FeSO$_4$ | 0.176 | 1.08 |
| Dacthal W-75 | 1.37 | 8.42 |
| Bio-Terge AS-90F | 0.511 | 3.14 |
| Isobutyl Alcohol | 0.481 | 2.96 |
| Cab-O-Sil M-5 | 0.163 | 1.00 |

The same procedure as in Example I is used, with The Dacthal W-75 being added with the Bio-Terge and Cab-O-Sil.

EXAMPLE III

Dry Foam-providing Concentrate With Fertilizer and Broadleaf Weed Killer

| Formulation | Lbs. | % |
| --- | --- | --- |
| Uramite (M) | 7.14 | 46.91 |
| Urea (agric. grade, uncoated prills) | 5.11 | 33.57 |
| KTP | 1.32 | 8.67 |
| FeSO$_4$ | 0.176 | 1.16 |
| 2,4-D acid | 0.16 | 1.05 |
| MCPP acid | 0.16 | 1.05 |
| Bio-Terge AS-90F | 0.511 | 3.36 |
| Isobutyl alcohol | 0.481 | 3.16 |
| Cab-O-Sil | 0.163 | 1.07 |

The procedure of mixing of Example 1 is repeated except that the 2,4-D acid and MCPP acid were first dissolved in the isobutyl alcohol before it is combined with the other ingredients.

EXAMPLE IV

In a storage test, about 3.5 lbs. of a dry fertilizer containing composition, stored for 13 months, was reformulated into a liquified state by dispersion both 1030 cc of water. A dilution ratio of 4 gallons of water per 600–900 cc of concentrate was employed, together with a four foot hose to ensure adequate mixing after eduction of concentrate. Water temperature in this test was 96° F., and water rate was measured at 3.9 gpm, although lower temperatures and varying rates were applicable to other comparable tests conducted during the 13 months term using the same apparatus and concentrate. In each case, redispersion of the dry concentrate and subsequent broadcasting of foam was effected satisfactorily.

The concentrates of Examples 1–4 are readily dispersed in water by handshaking at a moderate rate for about 30 seconds. On emptying the container, there is no evidence of undispersed solids at the bottom of the container and no lumps of solids in the liquid concentrate itself.

EXAMPLE V

The formulation of Example 1 is prepared using higher alcohols in lieu of butyl alcohol with similar results. These alcohols include amyl alcohol, 2-ethylhexanol, cyclohexanol, phenylethanol and n-octyl alcohol.

| Component | Identification of Commercial Names | |
|---|---|---|
| | Identification | Source |
| Stepanol 317 | 92.5% active blend of linear alkyl sulfonates and linear/alcohol ether sulfonates | Stepan Chemical Co. Northfield, Illinois |
| Stepanol 360 | 40 active, sodium lauryl sulfonate | Stepan Chemical Co. |
| Uramite | Urea-formaldehyde | E.I. DuPont de Nemours Co., Inc. Wilmington, Delaware |
| 2,4-D | 2,4-dichlorophenoxy acetic acid | Dow Chemical Co. MIdland, Michigan |
| MCPP | Potassium salt of 2-(2-methyl-4-chlorophenoxy propionic acid) | Dow Chemical Co. |
| Sevin | Carbaryl (1-naphthyl-N-methylcarbamate) | Union Carbide Corp. N.Y.C., New York |
| Dacthal | dimethyl ester of tetrachloro-terephthalic acid | Diamond Shamrock Corp. Cleveland, Ohio |
| Bio-Terge AS-90F | Sodium alpha olefin sulfonate olefin comprising $C_{14}$ and $C_{16}$ Fractions) | Stepan Chemical Co. |
| Cab-O-Sil M-5 | Silicon dioxide | Calbot Chemical Co. |

The 'dry' concentrates of the present invention are essentially particulate, or granular in nature, and are flowable in the manner of sand or a flour base material. Although some moisture may be entrained or retained in other manner as by the hygroscopicity of the ingredients, the concentrates are in no sense liquidified, and remain pourable i.e. unclumped under closed storage conditions (sealed without special precaution in ambient air) over extended periods of at least one calender year. A certain liquid content as, for example, the alcohol of limited water solubility, is present but the aforementioned characteristics retained, as a further function of the selective use of this material.

An acceptable expansion ratio may be determined visually with some experience, but initially may be ascertained by reference to the following test: A foam applicator, positioned about 48 inches from the substrate and elevated about a foot above the eduction point is utilized to project foam onto a measured surface (for convenience, one or more three liter beakers provide suitable means for capturing the foam in a measurable manner.) The measured quantity of foam (in case of beakers, filled to the top) is allowed to lie at rest for 5 to 10 minutes, the water drained or otherwise separated in a measured manner and the expansion ratio calculated as follows:

$$\text{Expansion Ratio} = \frac{\text{foam volume}}{\text{water volume}} = \frac{\text{Total volume-water volume}}{\text{water volume}}$$

Measurements are made with tap water between 50° and 75° F., at flow rates of 4.1 gal/min to 2.75 gal/min.

What is claimed is:
1. A dry particulate plant treating composition foamable with water comprising:
   a. urea-formaldehyde, urea, potassium tripolyphosphate and ferrous sulfate, and
   b. a solid foaming agent, and
   c. an alcohol of limited solubility which is soluble to the extent of approximately 15 to 20 parts per 100 parts of water or less.
2. The composition of claim 1 wherein the foaming agent is selected from the group consisting of alkyl sulfonates and alkylaryl sulfonates.
3. The composition of claim 2 wherein the foaming agent is an alpha olefin sulfonate.
4. The composition of claim 3 wherein the alcohol contains at least 4 carbon atoms.
5. The composition of claim 4 wherein the alcohol is selected from the group consisting of isobuytyl alcohol, amyl alcohol, 2-ethylhexanol, cyclohexanol, phenylethanol, and n-octyl alcohol.
6. The composition of claim 5 wherein said sulfonate and said alcohol comprise not more than 10 percent by weight of said composition.

* * * * *